United States Patent [19]

Mauldin et al.

[11] 4,292,204

[45] Sep. 29, 1981

[54] REFORMING WITH MULTIMETALLIC CATALYSTS

[75] Inventors: Charles H. Mauldin; William C. Baird, Jr., both of Baton Rouge, La.

[73] Assignee: Exxon Research & Engineering Co., Florham Park, N.J.

[21] Appl. No.: 53,376

[22] Filed: Jun. 29, 1979

[51] Int. Cl.³ .................... B01J 27/04; B01J 27/08; B01J 27/10; B01J 23/64
[52] U.S. Cl. .................... 252/439; 252/441; 252/466 PT; 208/138; 208/139
[58] Field of Search ............. 252/441, 466 PT, 439

[56] References Cited

U.S. PATENT DOCUMENTS 3,578,583  5/1971  Buss .................... 252/466 PT X
3,790,473  2/1974  Rausch .................... 252/441 X

*Primary Examiner*—Patrick Garvin
*Attorney, Agent, or Firm*—Llewellyn A. Proctor

[57] ABSTRACT

A catalyst constituted of a composite which includes hydrogenation-dehydrogenation components comprised of palladium and rhenium to which a small amount of iridium is added to increase the aromatic content of the reformate, particularly the high octane $C_9^+$ aromatics, and reduce the coking tendency of the catalyst. It also encompasses the process of employing such catalyst in reforming, particularly high severity low pressure, semi-regenerative reforming.

14 Claims, No Drawings

REFORMING WITH MULTIMETALLIC CATALYSTS

BACKGROUND OF THE INVENTION AND PRIOR ART

Catalytic reforming, or hydroforming, is a process well known to the petroleum refining industry for improving the octane quality of naphthas and straight run gasolines. In a typical process, a series of reactors are provided with fixed beds of catalyst which receive upflow or downflow feed, and each reactor is provided with a preheater or interstage heater, because the reactions which take place are endothermic. A naphtha feed, with hydrogen, or recycle gas, is cocurrently passed through a reheat furnace and reactor, and then in sequence through subsequent heaters and reactors of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound of compounds thereof, providing a hydrogenation-dehydrogenation (hydrogen transfer) function and an acidic component providing an isomerization function. The platinum group metals (ruthenium, osmium, rhodium, iridium, palladium and platinum), particularly platinum, have been widely used in commercial reforming operations, these metals being composited with an inorganic oxide base, particularly alumina; and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Rhenium, on the one hand, has been found particularly useful in providing excellent $C_5+$ liquid yields and stability. Iridium, on the other hand, has been found particularly useful in promoting catalyst activity. Halogen, e.g., chlorine, is generally added to provide the required acid function.

Palladium is widely discussed in the technical and patent literature as a hydrogenation-dehydrogenation component, and is generally considered as a substitute for platinum. Nevertheless, despite the considerably lower cost of palladium, as contrasted with platinum, this metal has never been extensively used, if at all, in commercial reforming operations. The basic reason, among others, is that a palladium reforming catalyst is far less active than platinum and is deactivated all too rapidly under reforming conditions. For example, the substitution, or replacement, of platinum by an equal weight (or molar) concentration of palladium in a catalyst containing equal weight (or molar) concentrations of rhenium, e.g., a 0.3 wt. % Pd/0.3 wt. % Re catalyst, at start-up conditions can cause deactivation of the catalyst within about the first fifty hours on oil. The same effect is observed by comparison of catalysts otherwise similar except that they do not contain rhenium. Accordingly, despite its lower cost, palladium has not proven a useful metal in commercial reforming operations.

The principal reactions produced in reforming are dehydrogenation of naphthenes to produce the corresponding aromatic hydrocarbons; isomerization of n-paraffins to form branched-chain paraffins and isomerization of ring compounds, and dehydrogenation of the latter to form aromatics; dehydrocyclization of paraffins to form aromatics; and hydrocracking of high molecular weight feed constituents to form lower molecular weight, or lower boiling, constituents, the net effect of these reactions being to increase the concentration of aromatics and isomers, with consequent octane improvement of naphthas boiling within the gasoline range. Hydrogenolysis, however, a specific and severe form of hydrocracking which produces methane, can also occur; and hydrogenolysis is particularly acute in reforming with platinum-rhenium and platinum-iridium catalysts, particularly fresh or regenerated, reactivated platinum-rhenium and platinum-iridium catalysts, which are particularly hypersensitive.

It is primarily the objective of the present invention to obviate these and other prior art deficiencies, particularly by providing new and improved catalysts, and a process for utilizing such catalysts for upgrading naphthas, especially paraffinic naphthas, by reforming to produce higher octane gasolines.

A particular object is to provide a new and improved reforming process for effecting, at suitable reforming conditions, the production of high octane gasolines while minimizing hydrogenolysis and other types of hydrocracking which tend to produce methane and hydrocarbon gases of higher molecular weight than methane.

A more particular object is to provide more highly active reforming catalysts which are highly suitable for high severity operations and which, at low pressures provide increased aromatics formation at low coking rates.

These and other objects are achieved in accordance with the present invention embodying a catalyst comprised of palladium and rhenium to which iridium is added in small concentration relative to the concentration of the palladium and rhenium, composited with an inorganic oxide support, or carrier; and the use of such catalyst in reforming. The relatively small amount of iridium apparently acts to provide high stability to this catalyst as contrasted with a platinum-rhenium catalyst, a palladium-rhenium catalyst, or catalyst otherwise similar except that it does not contain an iridium promoter. The iridium promoter produces a catalyst which brings about an increase in the aromatic content of the reformate, particularly the high octane $C_9+$ aromatics, and the lower density of the $C_9+$ aromatics also provides higher liquid volume yields for a given weight of reformate. Coke is also produced at a lower rate than produced with platinum-rhenium catalysts, and a catalyst constituted of the triumvirate of metals also provides a more stable operation at higher severity conditions, particularly at low pressures. The catalyst provides a more selective dehydrocyclization of a naphtha feed, especially a paraffinic feed, to produce $C_6$ naphthenes which are the desired aromatic precursors; provides less isomerization of feed paraffins which are more difficult to aromatize and are prone to cracking; and provides a reduced dependency on catalyst acidity which tends to decrease acid cracking and coking.

In its preferred aspects, the catalyst is comprised of palladium, rhenium, and halogen composited with an inorganic oxide support, or carrier, to which a small concentration of iridium is added to increase the ability of the catalyst to form C$_9$+ aromatics, lower the rate of coke formation and improve the stability of the catalyst in reforming, as contrasted with a platinum-rhenium catalyst, a widely available commercial catalyst; or a catalyst otherwise similar except that the catalyst does not contain any iridium. In its preferred aspects the catalyst also contains a sulfur component.

The catalyst is one which contains palladium as an essential component, generally in concentration ranging from about 0.1 percent to about 2 percent, preferably from about 0.2 percent to about 0.6 percent, based on the weight of the catalyst (dry basis). The catalyst also contains rhenium as an essential component, generally in concentration ranging from about 0.1 percent to about 2 percent, preferably from about 0.2 percent to about 0.6 percent, based on the weight of the catalyst (dry basis). Preferably, the palladium and rhenium are employed in weight ratios of palladium:rhenium ranging from about 0.25:1 to about 3:1, more preferably from about 0.75:1 to about 1.25:1; and most preferably is employed in substantially equal weight ratios when the total content of these metals ranges from about 0.4 percent to about 1 percent, based on the total weight of the catalyst (dry basis).

Iridium is an essential component, and the present invention is based on the discovery that an iridium promoted palladium-rhenium catalyst, particularly at low pressures and when using paraffinic feeds, provides increased C$_9$+ aromatics formation and low coke formation rates relative to the commercially used platinum-rhenium catalysts. The iridium component is added to the catalyst in amount sufficient to incorporate from about 0.01 to about 0.2 percent iridium, preferably from about 0.025 to about 0.1 percent iridium, based on the weight of the catalyst (dry basis). Preferably also, the iridium is composited with the catalyst in amount sufficient to provide an atom ratio of iridium:(palladium plus rhenium) ranging from about 0.02:1 to about 0.35:1, preferably from about 0.04:1 to about 0.20:1.

It is well known that platinum reforming catalysts require substantial acidity for optimum catalytic activity, and that the required acidity is normally imparted by the addition of a halide, e.g., a chloride, to the catalyst. The acidity is required to isomerize the C$_5$ naphthenes (produced by platinum catalyzed dehydrocyclization) to produce C$_6$ naphthenes, which are subsequently aromatized by dehydrogenation. In the absence of this acidity rapid deactivation of the catalyst occurs as a consequence of the coking tendency possessed by the C$_5$ naphthenes. The chloride level required for platinum catalysts is nominally about 1 wt. % with a range of about 0.9-1.1 wt. % being typical; though some platinum based catalysts require even higher chloride levels approaching in some cases 1.3-1.6 wt. %. A too high level of acidity has several deleterious effects on the reforming process. For example, acid catalyzed cracking reactions have a tendency to depress liquid yields. Also, a too high catalyst acidity favors polymerization and coking reactions, which depresses activity. Moreover, since the catalyst is dependent on this acidity, the process must be operated in such a way as to retain catalyst halide at the required effective levels. This requires careful control of feed chloride, water content, and in fact, the overall water content of the total process. During catalyst regeneration and rejuvenation proper attention must be directed to restoring the required catalyst halide.

It has been determined, however, that the iridium promoted palladium-rhenium catalysts have a different halide dependency than platinum catalysts. Since these catalysts preferentially dehydrocyclize paraffins to C$_6$ naphthenes, the need to process C$_5$ naphthenes through acid catalyzed chemistry is diminished. This feature permits a reduction in catalyst halide which favors yield by decreasing acid cracking and coking reactions and favors activity by decreasing polymerization and coking. It has also been established that palladium-rhenium catalysts of give halide level have a higher "apparent acidity" than platinum catalysts. This means that catalysts halide level and halide level control are less critical for palladium-rhenium catalysts than for platinum catalysts. This property of palladium-rhenium catalysts also permits the selection of an optimum halide level for the particular feedstock being processed. In general, paraffinic naphthas require lower halide levels than naphthenic naphthas when reformed over palladium-rhenium catalysts. Both feeds, however, can be processed over palladium-rhenium catalysts at lower halide levels than required by platinum catalysts. The halide levels required by palladium-rhenium catalysts normally range from about 0.1 to about 1.2 wt. % as compared to >0.9 wt. % for platinum catalysts. The range of about 0.3-0.9 wt. % is preferred; the range of about 0.5-0.7 wt. % being most preferred. Paraffinic feeds better utilize halide levels in palladium-rhenium catalysts in about the 0.5-0.7 wt. % range while naphthenic feeds better utilize halide levels >0.7 wt. %.

Sulfur is also a highly preferred component, the sulfur content of the catalyst generally ranging to about 0.2 percent, preferably from about 0.05 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and pressures ranging about 1 to about 40 atmospheres for the time necessary to achieve breakthrough, or the desired sulfur level.

The several components of the catalyst are composited with a refractory inorganic oxide support material, particularly alumina. Suitably, the metal hydrogenation-dehydrogenation components can be separately added to the support, or added simultaneously. The halogen component, particularly chlorine, is added along with the hydrogenation-dehydrogenation components, or subsequent thereto, or both. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g., preferably from about 100 to about 300 m$^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to about 300 Å.

The metal hydrogenation-dehydrogenation components can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salts of the required metals and ammonium hydroxide or ammonium carbonate, and a salt of aluminum such as aluminum chloride or aluminum sulfate to form aluminum hydroxide. The aluminum hydroxide containing the salts can then be heated, dried, formed into pellets or extruded, and then calcined in nitrogen or other non-agglomerating atmosphere. The metal hydrogenation-dehydrogenation components are preferably added to the catalyst by impregnation, typically via an "incipient wetness" technique which requires a minimum of solution so that the total solution is absorbed, initially or after some evaporation.

Suitably, the metal hydrogenation-dehydrogenation components are deposited on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated with either the "incipient wetness" technique, or a technique embodying absorption from a dilute or concentrated solution, or solutions, with subsequent filtration or evaporation to effect total uptake of the metallic components.

In compositing the metals with the carrier, essentially any soluble compound of the respective metal can be used, but a soluble compound which can be easily subjected to thermal decomposition and reduction is preferred, for example, inorganic salts such as halide, nitrate, inorganic complex compounds, or organic salts such as the complex salts of acetylacetone, amine salt, and the like.

The impregnation of the palladium, rhenium and iridium components into a carrier is carried out by impregnating the carrier with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or superatmospheric pressures.

The catalysts, after impregnation, is dried by heating at a temperature above about 80° F., preferably between about 150° F. and 300° F., in the presence of an inert or non reactive gas, or under vacuum. The catalyst is calcined at a temperature between about 500° F. to 1200° F., preferably about 500° F. to 1050° F., suitably in the presence of an inert gas such as $N_2$, or in a low oxygen content gas which does not cause agglomeration of the iridium.

The catalyst can be activated by contact with an inert, or low oxygen content gas at temperatures ranging from about 500° F. to about 1050° F. for periods ranging from about 1 to about 24 hours at either flowing or static conditions. Treatment with pure air at temperatures >850° F. should be avoided. Reduction is performed by contacting the catalyst with flowing hydrogen at temperatures ranging from about 350° F. to about 1050° F. for periods ranging from about 0.5 to about 24 hours at pressures ranging from about 1 to about 40 atm. The catalyst can be sulfided by use of a blend of $H_2S/H_2$ and the sulfiding is performed at temperatures ranging from about 350° F. to about 1050° F. at pressures ranging about 1–40 atm. for a time necessary to acheve breakthrough, or the desired sulfur level. Postsulfiding stripping can be employed if desired at conditions similar to those for reduction of the catalyst.

Treatment of the catalyst with chlorine, or a mixture of chlorine and oxygen can be substituted for air activation if desired. This procedure can correct for any possible maldispersion of the metals arising from improper impregnation, and the procedure is useful in restoring activity during regeneration-rejuvenation after on oil service. A blend of chlorine, oxygen and nitrogen can also be employed at temperatures ranging from about 350° F. to about 1050° F. for periods ranging from about 1 to about 24 hours at pressures ranging from about 1–40 atm. Treat times for these various operations are a function of gas flow rates, gas compositions, and conditions. The catalyst halide content can be controlled during impregnation, or adjusted by treatment with water or water-hydrogen chloride blends.

This catalyst is particularly useful in conducting semiregenerative reforming operations, particularly at severe reforming conditions, i.e., at low pressures or high tempeatures, or both. At these extreme conditions the production of a high octane product is favored, and the catalyst is particularly tolerant to coke formation which tends to cause catalyst deactivation. The catalyst is particularly useful at low pressures, or pressures ranging from about 50 psig to about 150 psig, where maximum yield is favored.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
| --- | --- | --- |
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |
| Feed Rate, W/Hr/W | 0.5–10 | 1–3 |

The invention will be more fully understood by reference to the following demonstrations and examples which present comparative data illustrating its more salient features. All parts are given in terms of weight except as otherwise specified.

EXAMPLES

A commercial platinum-rhenium catalyst (Catalyst A), the composition of which is given in Table I, was dried and activated by contact with air at 100° F. for 3½ hours. A portion of the catalyst was charged to a quartz reactor and reduced in flowing $H_2$ at 932° F. for 1 hour at 600 cc/min. The catalyst was breakthrough sulfided using 0.2 vol. % $H_2S$ in $H_2$ at 932° F. and 600 cc/min. The catalyst was then treated with $H_2$ at 932° F. for 2 hours at 600 cc/min.

Catalyst B was prepared from a portion of 1/16" high purity gamma alumina extrudates by calcining same in air at 1000° F. for 4 hours. The extrudates were similarly impregnated with aqueous solutions of $PdCl_4$, perrhenic acid, an iridic acid. The catalyst was then dried, calcined at 750° F. and reduced, and sulfided at 932° F. in a manner similar to the preparation of Catalyst A. The composition of the catalyst is given in Table I.

TABLE I

| Components | Catalyst A | Catalyst B |
|---|---|---|
| Platinum | 0.30 | — |
| Palladium | — | 0.22 |
| Iridium | — | 0.073 |
| Rhenium | 0.30 | 0.22 |
| Chlorine | 1.03 | 0.94 |
| Sulfur | 0.14 | 0.067 |
| Alumina | 98.23 | 98.48 |

The catalysts were each then contacted at reforming conditions in separate runs with a virgin naphtha from a light Arabian crude the inspections of which are given in Table II.

TABLE II

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No., RON CLear | 34.8 |
| Gravity, °API | 59.7 |
| Sulfur, Wt. ppm | <0.1 |
| Water, Wt. ppm | <10 |
| Chlorine, Wt. ppm | <0.1 |
| Analysis, Vol. Percent | |
| Paraffins | 69.4 |
| Naphthenes | 16.7 |
| Aromatics | 13.9 |

The results of the reforming operations are given in Tables III and IV.

Table III illustrates the effect of process variables on aromatics distribution for Pd/Re/Ir and Pt/Re catalysts. From these data it is seen that the Pd/Re/Ir catalyst favors the formation of $C_9+$ aromatics at all conditions, and this trend is enhanced at low pressure. Table IV illustrates the coking tendency of these catalysts at various process conditions. The Pt/Re catalyst produces coke at a greater rate than Pd/Re/Ir at all conditions. For this reason, Pd/Re/Ir is a preferred catalyst for low pressure reforming.

TABLE III

| Catalyst | A(Pt/Re) | A(Pt/Re) | B(Pd/Re/Ir) | B(Pd/Re/Ir) |
|---|---|---|---|---|
| Temperature, °F. | 930 | 930 | 930 | 930 |
| Pressure, psig | 200 | 100 | 200 | 100 |
| Aromatic Selectivity | | | | |
| $C_6$-$C_8$ | 70 | 62 | 62 | 60 |
| $C_9+$ | 30 | 38 | 38 | 40 |

TABLE IV

| Catalyst | A(Pt/Re) | A(Pt/Re) | B(Pd/Re/Ir) | B(Pd/Re/Ir) |
|---|---|---|---|---|
| Temperature, °F. | 930 | 930 | 930 | 930 |
| Pressure, psig | 200 | 100 | 200 | 100 |
| Hours on Oil | 385 | 166 | 430 | 413 |
| Coke, wt. % | 6.6 | 7.3 | 4.1 | 7.9 |
| Coking Rate, Wt. %/Hr. | 0.017 | 0.044 | 0.010 | 0.019 |

It is apparent that various modifications and changes can be made without departing the spirit and scope of the present invention.

Having described the invention, what is claimed is:

1. A reforming catalyst which consists of from about 0.1 to about 2 percent palladium, from about 0.1 to about 2 percent rhenium, and from about 0.01 to about 0.2 percent iridium composited with an inorganic oxide support.

2. The composition of claim 1 wherein the catalyst contains from about 0.2 to about 0.6 percent palladium.

3. The composition of claim 1 wherein the catalyst contains from about 0.2 to about 0.6 percent rhenium.

4. The composition of claim 1 wherein the catalyst contains from about 0.025 to about 0.1 percent iridium.

5. The composition of claim 1 wherein the catalyst contains from about 0.2 to about 0.6 percent palladium, from about 0.2 to about 0.6 percent rhenium, from about 0.025 to about 0.1 percent iridium, and wherein the iridium is composited with the catalyst in amount sufficient to provide a molar ratio of iridium:(palladium plus rhenium) ranging from about 0.02:1 to about 0.35:1.

6. The composition of claim 1 wherein the catalyst contains from about 0.1 to about 1.2 percent halogen.

7. The composition of claim 6 wherein the catalyst contains from about 0.5 to about 0.7 percent halogen.

8. The composition of claim 1 wherein the catalyst is sulfided, and contains to about 0.2 percent sulfur.

9. The composition of claim 8 wherein the catalyst contains from about 0.05 to about 0.1 percent sulfur.

10. The composition of claim 1 wherein the catalyst contains from about 0.2 to about 0.6 percent palladium, from about 0.2 to about 0.6 percent rhenium, and from about 0.025 to about 0.1 percent iridium.

11. The composition of claim 10 wherein the catalyst contains from about 0.5 to about 0.7 percent halogen.

12. The composition of claim 10 wherein the catalyst is sulfided, and contains from about 0.05 to about 0.1 percent sulfur.

13. The composition of claim 10 wherein the catalyst contains palladium and rhenium in weight ratio palladium:rhenium ranging from about 0.25:1 to about 3:1.

14. The composition of claim 13 wherein the catalyst contains palladium and rhenium in weight ratio palladium:rhenium ranging from about 0.75:1 to about 1.25:1.

* * * * *